US009486110B2

(12) United States Patent
Chen

(10) Patent No.: US 9,486,110 B2
(45) Date of Patent: Nov. 8, 2016

(54) NUT DISASSEMBLING DEVICE

(71) Applicant: Jun-Fan Chen, Taichung (TW)

(72) Inventor: Jun-Fan Chen, Taichung (TW)

(*) Notice: Subject to any disclaimer, the term of this patent is extended or adjusted under 35 U.S.C. 154(b) by 406 days.

(21) Appl. No.: 14/261,335

(22) Filed: Apr. 24, 2014

(65) Prior Publication Data

US 2015/0305569 A1    Oct. 29, 2015

(51) Int. Cl.
*B25B 13/16* (2006.01)
*B25B 13/48* (2006.01)
*A47J 43/26* (2006.01)

(52) U.S. Cl.
CPC ...................................... *A47J 43/26* (2013.01)

(58) Field of Classification Search
CPC .............................. B25B 13/16; B25B 13/48
USPC ........................................................ 81/163
See application file for complete search history.

(56) References Cited

U.S. PATENT DOCUMENTS

| 545,944 | A * | 9/1895 | Champane | B25B 13/30 81/118 |
| 2,562,131 | A * | 7/1951 | Scovill | B25B 13/16 269/219 |
| 6,715,385 | B2 * | 4/2004 | Wu | B25B 13/10 81/163 |
| 6,862,957 | B2 * | 3/2005 | Wang | B25B 13/10 81/176.3 |
| 7,997,168 | B2 * | 8/2011 | Kinskey | B25B 13/16 81/163 |
| 8,495,932 | B2 * | 7/2013 | Chen | B25B 13/16 81/163 |

* cited by examiner

*Primary Examiner* — David B Thomas
(74) *Attorney, Agent, or Firm* — Muncy, Geissler, Olds & Lowe, P.C.

(57) ABSTRACT

A nut disassembling device is provided, comprising an adjustment member, a support rod, a center pillar and two clamping blocks. The support rod is screwed with two tightening members. Each of the tightening members is rotatable relative to the support rod, and the clamping block is moved by the tightening member. Thus, during the clamping of the nut, the clamping blocks close and push the nut through rotation of the tightening members, and it effectively improves the clamping for installation and uninstallation of the nut.

8 Claims, 4 Drawing Sheets

NUT DISASSEMBLING DEVICE

BACKGROUND OF THE INVENTION

1. Field of the Invention

The present invention relates to a nut disassembling device, and more particularly to a disassembling structure for nuts on vehicle tires.

2. Description of the Prior Art

In prior arts, a reaction force occurs when a nut disassembling structure abuts against a nut, and it makes the clamping performance bad. So that the nut wears down while applying forces on it in a disassembling process, and this disadvantage is needed to be improved.

The present invention has arisen to mitigate and/or obviate the afore-described disadvantages.

SUMMARY OF THE INVENTION

The primary object of the present invention is to provide a nut disassembling device to improve the performance of clamping a nut.

To achieve the above object, a nut disassembling device in accordance with present invention comprises an adjustment member, a support rod, a center pillar and two clamping blocks.

The support rod includes a third threaded portion and two tightening members screwed to the third threaded portion. The center pillar includes a first through hole and a second through hole, the first through hole is for penetration of the adjustment member, and the second through hole is for penetration of the third threaded portion of the support rod. Each clamping block includes a clamping portion, a third through hole and a fourth through hole, and the fourth through hole locates between the clamping portion and the third through hole. The adjustment member inserts in the third through hole or the fourth through hole and is able to drive the clamping block to move. The other of the third and fourth through holes which unpenetrates through the adjustment member is movably disposing around the third threaded portion of the support rod. The tightening members are disposed on the support rod, and when each of the tightening members rotates relative to the support rod, the clamping block is moved by the tightening member.

When clamping a nut and disassembling it, the tightening member is rotatable to drive the clamping portion to farther abut against the nut tightly. It improves the performance of clamping the nut, so that it is convenient for disassembling the nut. It also improves the abrasion of a part and elongates a usage life of a structure.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
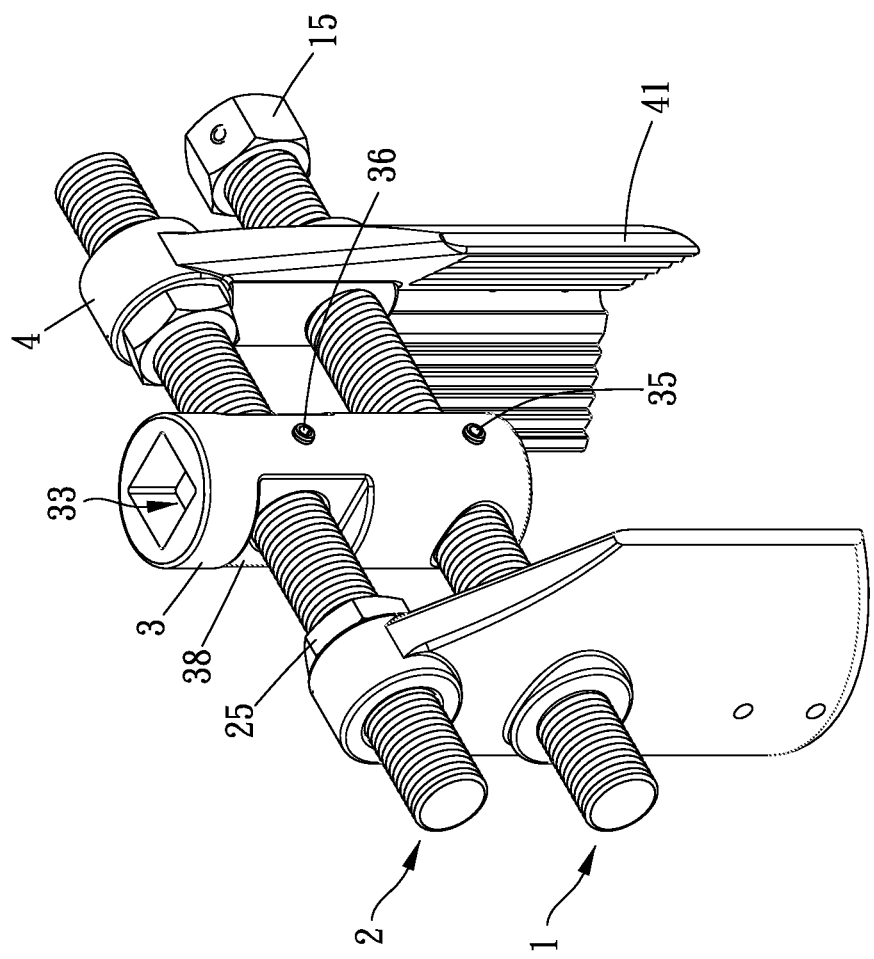
FIG. 1 is a three-dimensional drawing showing a preferable embodiment of the present invention.
Figure 2:
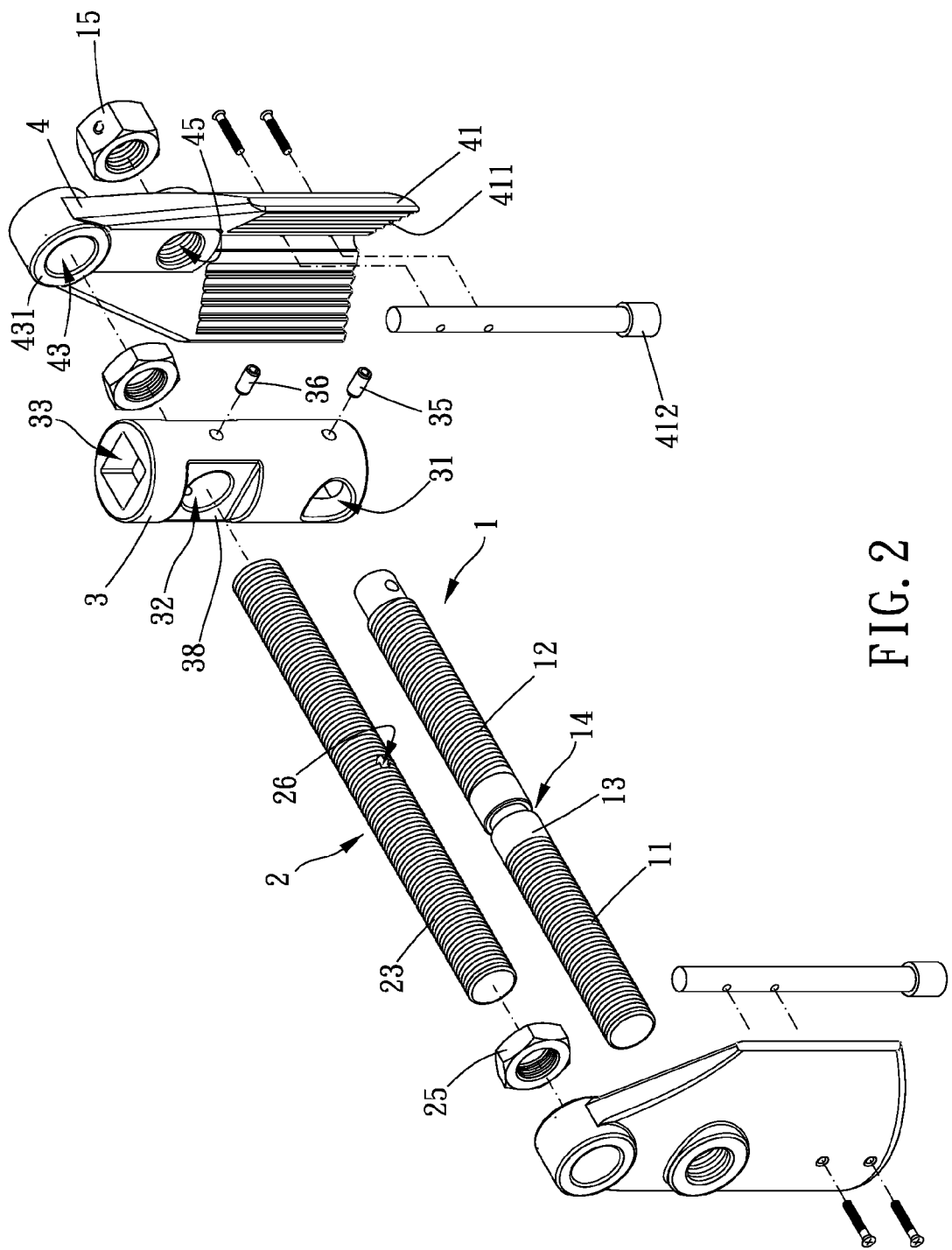
FIG. 2 is a breakdown drawing showing a preferable embodiment of the present invention.
Figure 3:
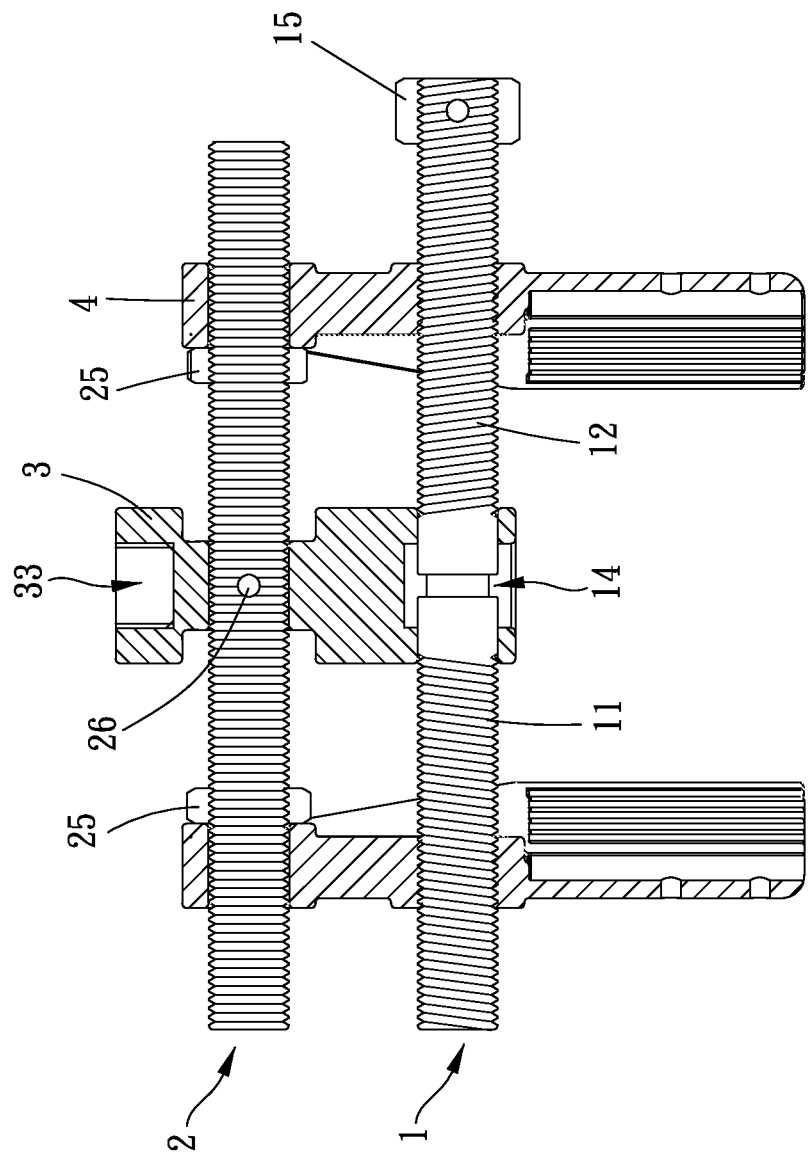
FIG. 3 is a cross-sectional drawing showing a preferable embodiment of the present invention.

Referring to FIGS. 1-3, a nut disassembling device includes an adjustment member 1, a support rod 2, a center pillar 3 and two clamping blocks 4.

The adjustment member 1 includes a first threaded portion 11, a second threaded portion 12 and a middle portion 13. The thread direction of the first threaded portion 11 is opposite to that of the second threaded portion 12. The middle portion 13 locates between the first threaded portion 11 and the second threaded portion 12. The middle portion 13 is formed with a circular slot 14. Besides, the adjustment member 1 is formed with a driving part 15 at one end, and the driving part 15 includes a polygonal outer circumferential surface. The driving part 15 is for connecting with a tool (such as a wrench) and drives the adjustment member 1 to rotate by using the tool.

The support rod 2 includes a third threaded portion 23 and two tightening members 25 screwed to the third threaded portion 23. In the present embodiment, the tightening member 25 is such as a nut. And the support rod 2 is formed with a positioning hole 26 in the middle.

The center pillar 3 includes a first through hole 31, a second through hole 32 and a concave hole 33. The first through hole 31 is movably inserted with the adjustment member 1 and able to move to the middle portion 13. The first through hole 31 is movable along the adjustment member 1. The second through hole 32 is movably inserted with the third threaded portion 23 of the support rod 2. The second through hole 32 is movable along the support rod 2. The concave hole 33 locates on one end of the center pillar 3. In the present embodiment, the concave hole 33 is a polygonal hole and for connecting with a tool. When the center pillar 3 is disposed on the middle portion 13 of the adjustment member 1, the first fixing pin 35 inserts in the first through hole 31 and the circular slot 14. So that the center pillar 3 remains on the middle portion 13 and they are rotatable relative to each other. The second fixing pin 36 inserts in the second through hole 32 and the positioning hole 26, so that the center pillar 3 and the support rod 2 are fixed relative to each other.

Each of the two clamping blocks 4 includes a clamping portion 41, a third through hole 43 and a fourth through hole 45. The clamping portion 41 and the third through hole 43 are respectively disposed on the two ends of the clamping block 4. The fourth through hole 45 locates between the clamping portion 41 and the third through hole 43. Each of the fourth through holes 45 includes inner thread and is for screwing with the first threaded portion 11 and the second threaded portion 12. So that the adjustment member 1 inserts in the fourth through hole 45 and drives the clamping block 4 to move. Specifically, when the adjustment member 1 rotates in a forward direction or in a reverse direction, it changes the distance between the two clamping blocks 4. Each of the third through holes 43 is for movable penetration of the third threaded portion 23 of the support rod 2 (wherein the adjustment member inserts in the third or fourth through hole and drives the clamping block to move, the other of the third and fourth through holes which unpenetrates through the adjustment member is movably disposing around the third threaded portion of the support rod, and the adjustment member is unlimited to only insert in the fourth through hole). Each of the two clamping blocks 4 is formed with a resisting surface 431 close to the third through hole 43 for contacting with the tightening member 25. In the present embodiment, the resisting surface 431 is a bordering surrounding the third through hole 43 and towards the center pillar 3. The clamping portion 41 of the clamping block 4 is <-shaped and includes two surfaces 411 inclining to each other. Each of the surfaces 411 is formed with a plurality of grooves. The surface 411 is unplanar and formed as concave-convex-shaped to increase the stability of clamping. And the clamping portion 41 further includes a detachable stud 412, so that the stud 412 is able to insert in the concave hole of a disassembling part.

Figure 4:
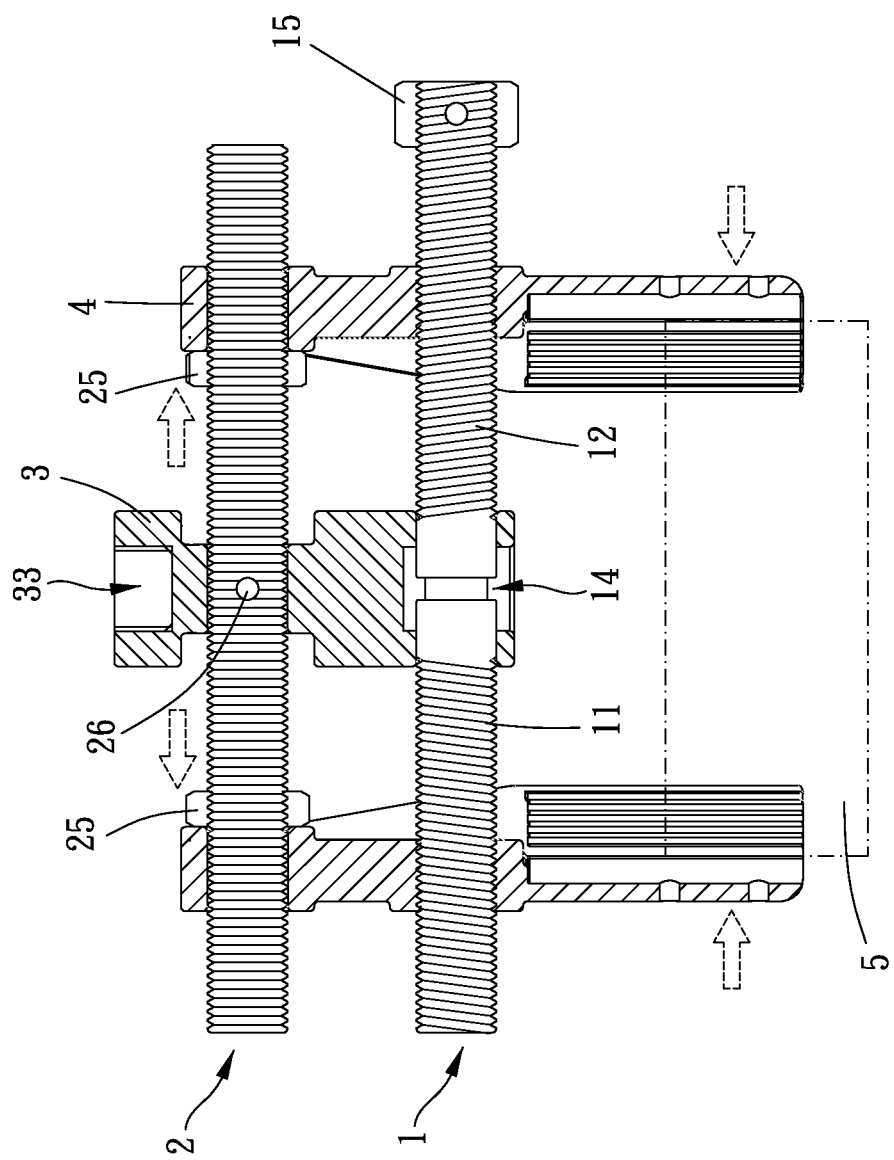
FIG. 4 is a perspective drawing showing a preferable embodiment of the present invention in use.

When clamping a nut 5 and disassembling it (refer to FIG. 2 and FIG. 4), the tightening member 25 is screwed to the support rod 2 and locates between the center pillar 3 and the clamping block 4 first, and then the adjustment member 1 is rotated to drive the two clamping blocks 4 to come close to or far away from each other. Specifically, the support rod 2 is provided with the tightening member 25, and each of the tightening members 25 rotates relative to the support rod 2 to push the clamping block 4 outwardly and adjust the distance between the two clamping block 4. So that the clamping portions 41 of the clamping blocks 4 are able to clamp the nut 5 tightly. After the clamping portions 41 clamp the nut 5, the tightening members 25 are relatively driven to move toward the ends of the support rod 2 to increase the clamping performance of the clamping portion 41. Specifically, when each of the tightening members 25 rotates relative to the support rod 2, the tightening member 25 pushes the resisting surface 431 and drives the clamping block 4 to move relative to the support rod 2. The tightening member 25 is used to align the clamping block 4 and drives the clamping portion 41 to farther abut against the nut 5 and clamp it tightly (shown in FIG. 4). As a result, the stability of clamping is increased, and the disadvantage that the nut 5 is unable to be clamped tightly due to clearance is also improved.

Hence, when clamping the nut, the tightening member 25 is rotatable to drive the clamping portion 41 to farther abut against the nut tightly. It increases the performance of clamping the nut 5, so that it is convenient for disassembling and also improves the abrasion of the mechanism and elongates the usage life of the structure.

The design of the tightening member 25 increases the support performance and the strength of the whole structure, so that the transmission of force is more direct during the disassembling process by rotating the center pillar 3, and the disadvantage of poor stability due to clearance is diminished.

It is noted that, in the present embodiment, the center pillar 3 is formed with a ⊓-shaped concave 38 respectively on both sides close to the second through hole 32. The shape of the concave 38 is corresponding to that of the tightening member 25, and the concave 38 is for receiving the tightening member 25, so that the tightening member 25 is stored in the concave 38 and abuts against the surface of the concave 38 after using it.

While we have shown and described various embodiments in accordance with the present invention, it should be clear to those skilled in the art that further embodiments may be made without departing from the scope of the present invention.

What is claimed is:

1. A nut disassembling device, comprising:
   an adjustment member;
   a support rod, including a third threaded portion and two tightening members screwed to the third threaded portion;
   a center pillar, including a first through hole and a second through hole, the first through hole for penetration of the adjustment member, the second through hole for penetration of the third threaded portion of the support rod; and
   two clamping blocks, each clamping block including a clamping portion, a third through hole and a fourth through hole, the fourth through hole locating between the clamping portion and the third through hole, the adjustment member inserting in the third through hole or the fourth through hole and able to drive the clamping block to move, the other of the third and fourth through holes which unpenetrates through the adjustment member is movably disposing around the third threaded portion of the support rod, the tightening member disposed on the support rod, wherein when each of the tightening members rotates relative to the support rod, the clamping block is moved by the tightening member.

2. The nut disassembling device as claimed in claim 1, wherein the center pillar is formed with a concave near the second through hole, and the concave is for receiving the tightening member.

3. The nut disassembling device as claimed in claim 1, wherein the adjustment member is formed with a driving part at one end, and the driving part includes a polygonal outer circumferential surface.

4. The nut disassembling device as claimed in claim 1, wherein the support rod is formed with a positioning hole, the center pillar is formed with a detachable second fixing pin, and the second fixing pin inserts in the positioning hole.

5. The nut disassembling device as claimed in claim 1, wherein the clamping portion of the clamping block is <-shaped and includes two surfaces inclining to each other.

6. The nut disassembling device as claimed in claim 5, wherein each of the surfaces is formed with a plurality of grooves.

7. The nut disassembling device as claimed in claim 1, wherein the adjustment member includes a first threaded portion, a second threaded portion and a middle portion, the thread direction of the first threaded portion is opposite to that of the second threaded portion, the middle portion locates between the first threaded portion and the second threaded portion, and each of the fourth through holes is for disposing around the first threaded portion and the second threaded portion.

8. The nut disassembling device as claimed in claim 7, wherein the middle portion is formed with a circular slot, the center pillar is provided with a detachable first fixing pin, and the first fixing pin inserts in the circular slot.

* * * * *